United States Patent
Diethorn

(10) Patent No.: US 8,284,926 B2
(45) Date of Patent: Oct. 9, 2012

(54) ENTERPRISE-DISTRIBUTED NOISE MANAGEMENT

(75) Inventor: Eric John Diethorn, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1239 days.

(21) Appl. No.: 11/861,637

(22) Filed: Sep. 26, 2007

(65) Prior Publication Data

US 2009/0080642 A1    Mar. 26, 2009

(51) Int. Cl.
*H04M 1/00* (2006.01)
*H04M 9/00* (2006.01)

(52) U.S. Cl. ............... 379/390.01; 379/392.01; 379/395

(58) Field of Classification Search ............ 367/198; 379/387.01, 388.01–388.07, 390.01–390.04, 379/420.01–420.04, 432; 381/71.1–71.14, 381/92, 94.1–94.9, 110, 111, 122; 455/456.1, 455/9

See application file for complete search history.

(56) References Cited

U.S. PATENT DOCUMENTS

| | | | |
|---|---|---|---|
| 4,123,620 A * | 10/1978 | Karlsson | 379/167.01 |
| 6,188,771 B1 | 2/2001 | Horrall | |
| 6,370,254 B1 * | 4/2002 | Gore et al. | 381/104 |
| 2001/0021259 A1 | 9/2001 | Horrall | |
| 2003/0198339 A1 | 10/2003 | Roy et al. | |
| 2004/0042615 A1 * | 3/2004 | Scholte | 379/387.01 |
| 2004/0116130 A1 * | 6/2004 | Seligmann | 455/456.1 |
| 2005/0213731 A1 * | 9/2005 | Rodman et al. | 379/202.01 |
| 2006/0142070 A1 * | 6/2006 | Park | 455/569.1 |
| 2006/0177046 A1 * | 8/2006 | Falcon | 379/430 |
| 2007/0050451 A1 * | 3/2007 | Caspi et al. | 709/204 |
| 2007/0053524 A1 * | 3/2007 | Haulick et al. | 381/92 |
| 2007/0202858 A1 * | 8/2007 | Yu | 455/414.1 |
| 2008/0089513 A1 * | 4/2008 | Kotzin et al. | 379/420.01 |

* cited by examiner

*Primary Examiner* — Fan Tsang
*Assistant Examiner* — Jeffrey Lytle

(57) ABSTRACT

A method is disclosed that enables the managing of the overall sound level in an enterprise environment where telephones are used. A data-processing system such as a private branch exchange monitors whether one or more telephones are in use. Based on detecting when a first endpoint is in use and, therefore, when the endpoint's user is present, the private branch exchange controls one or more characteristics of the loudspeaker volume at a second endpoint. By accounting for other considerations such as the spatial closeness between the endpoints, which can be determined from office dimensions stored in a database, the private branch exchange of the illustrative embodiment is able to determine the degree of sound that is coupling over from one endpoint location to another. On a larger scale, the exchange is able to control the loudspeaker volumes of all of the endpoints in the workplace area. In doing so, the exchange manages the overall acoustic noise present.

23 Claims, 4 Drawing Sheets

ENTERPRISE-DISTRIBUTED NOISE MANAGEMENT

FIELD OF THE INVENTION

The present invention relates to telecommunications in general, and, more particularly, to a method of managing the acoustic noise in a telecommunications environment of an enterprise.

BACKGROUND OF THE INVENTION

An enterprise that desires its employees to communicate effectively with one another must provide some type of telecommunications infrastructure. For example, the enterprise can use call-handling equipment such as private branch exchanges to enable employees to communicate conveniently with one another, as well as with people external to the enterprise. A private branch exchange, in particular, is capable of routing incoming calls from a telecommunications network, such as the Public Switched Telephone Network, via one or more transmission lines to any of the on-premises telephones that exist within the enterprise. Similarly, the private branch exchange is also capable of handling outgoing calls from any of the on-premises telephones to the telecommunications network.

Additionally, the private branch exchange is capable of providing telecommunications features that enable the forwarding of calls, the transferring of calls, conferencing, and so forth. Typically, each user of an on-premises telephone can create a customized profile that is stored at the private branch exchange and indicates to the exchange how to present information to and respond to signals from a telephone. In short, a private branch exchange—or other types of call-handling equipment, for that matter—provides a powerful business tool with which employees are able to communicate with one another and accomplish work in the process.

With telephones present throughout the enterprise, it should be unsurprising that the workplace can be extremely noisy and, as such, can be unfavorable to getting work done. The superfluous sounds from conversation-related noise sources can be heard throughout the workday, which sources include continually-occurring conference calls, enthusiastic users of speakerphones, and the ever-present din of background chatter, even from the relatively quiet users of handsets. Many office complexes are made up of cubicles, which because of their unenclosed nature can increase the noise level, compared to that experienced within an office complex that features rooms with floor-to-ceiling walls containing sound-reducing material. However, even in offices separated by these walls, the voice of a neighboring employee speaking enthusiastically into his speakerphone can still carry down a hallway and be highly distracting to those at least in the immediate area.

When multiple people use their speakerphones simultaneously, the overall noise level in the local area can increase even more. This often leads to the annoying effect of one or more people turning up the volumes of their speakerphones in an attempt to combat the distracting noise level. When one person turns up the speakerphone volume, there is a limited effect on the noise level. But when multiple people all turn up their speakerphones, invariably there is the effect of raising the overall noise level even more, over a wider area and sometimes beyond the point of mere distraction.

SUMMARY OF THE INVENTION

The present invention enables the managing of the overall sound level in an enterprise environment where telephones are used. In accordance with the illustrative embodiment of the present invention, a data-processing system such as a private branch exchange monitors whether one or more telephones are in use. The technique used by the private branch exchange in the illustrative embodiment is based on the assumption that whenever a telephone, or other type of telecommunications endpoint, is in use, a person using that endpoint also has to be present and is susceptible to the noises present in the immediate area. Based on detecting when a first endpoint is in use and, therefore, when the endpoint's user is present, the private branch exchange controls one or more characteristics of the loudspeaker volume at a second endpoint. By accounting for other considerations such as the spatial closeness between the endpoints, which can be determined from office dimensions stored in a database, the private branch exchange of the illustrative embodiment is able to determine the degree of sound that is coupling over from one endpoint location to another. On a larger scale, the exchange is able to control the loudspeaker volumes of all of the endpoints in the workplace area. In doing so, the exchange manages the overall acoustic noise present.

For example, suppose that a first person is next door to the office space of a second person who is using his speakerphone. The private branch exchange of the illustrative embodiment detects that the first person is present when she goes to make a call or answer her phone for an incoming call. As a result, the exchange then generates a controlling signal that is applied to the speakerphone of the second person. The controlling signal affects the loudspeaker volume of the second endpoint, such as to limit the maximum selectable volume level. Additionally, if the first person's endpoint is also a speakerphone, rather than a handset phone, the exchange might also effect a change in the loudspeaker volume of the first endpoint as well, in an effort to manage the overall noise level in the area common to the first and second persons. And if the exchange determines that the first person is no longer present, the exchange can lift the volume level restriction at the second endpoint.

The private branch exchange, in some embodiments, also accounts for uniform, non-transient noise that is not associated with telephone sound reproduction. For example, white or pink noise that is attributed to sources such as building fans, HVAC equipment, and sound-masking systems often has a beneficial effect in masking annoying transient sounds. The exchange monitors the non-telephone background noise that is present and further adjusts the permitted speakerphone volume levels accordingly.

The illustrative embodiment of the present invention comprises: receiving, at a data-processing system, (i) a first signal that indicates that a first telecommunications endpoint is in use, and (ii) a second signal that indicates that a second telecommunications endpoint is in use; generating a third signal that specifies the value of a first characteristic of loudspeaker volume, the third signal being based on the first signal; and transmitting the third signal to the second telecommunications endpoint.

DETAILED DESCRIPTION

Figure 1:
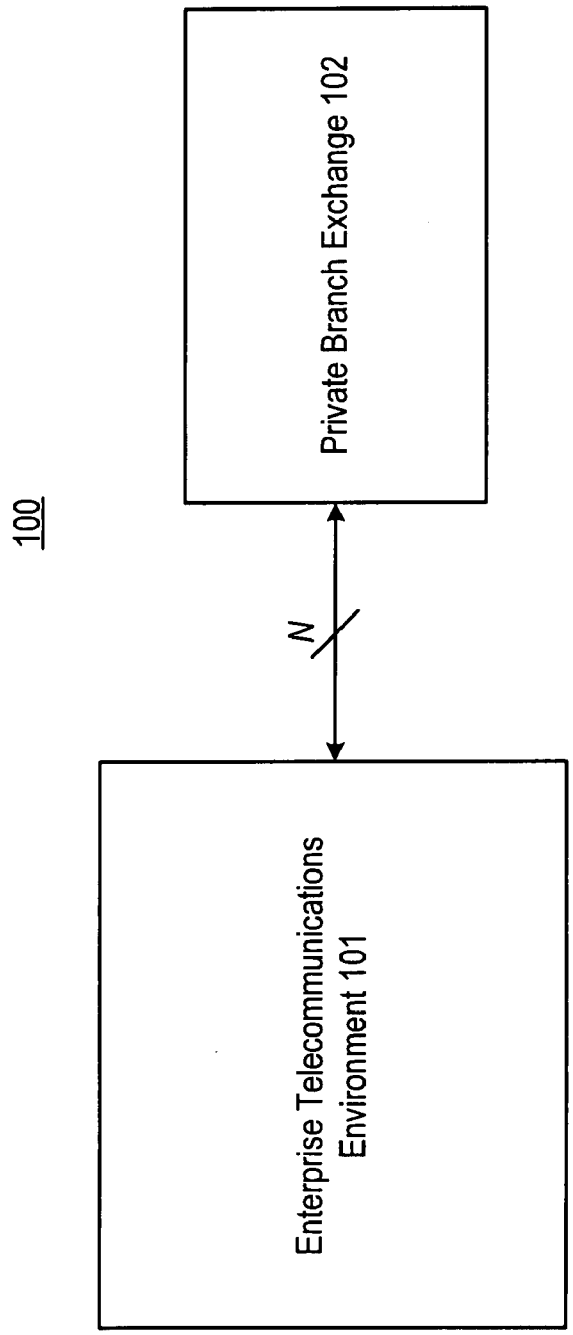
FIG. 1 depicts schematic diagram of the salient components of telecommunications system 100 in accordance with the illustrative embodiment of the present invention.

FIG. 1 depicts schematic diagram of the salient components of telecommunications system 100 in accordance with the illustrative embodiment of the present invention. System 100 comprises enterprise telecommunications environment 101 and private branch exchange 102, which serves environment 101.

Enterprise telecommunications environment 101 represents the telecommunications infrastructure at a particular enterprise location, such as at an office complex of a corporation. Environment 101 comprises a plurality of N telecommunications endpoints that are capable of originating, receiving, or otherwise handling telephone calls for their users. Each endpoint within environment 101 is connected to private branch exchange 102 for the purpose of enabling telephone calls and for carrying out the techniques of the illustrative embodiment. Environment 101 is described below and with respect to FIG. 2.

The telecommunications infrastructure that is present within environment 101 provides the connectivity between the endpoints and private branch exchange 102. The infrastructure comprises one or more telecommunications networks, including a local area network (LAN), along with switches, routers, and other networking equipment. In some embodiments, the infrastructure comprises the Internet or possibly other Internet Protocol-based networks. The endpoints within environment 101, in some embodiments, might be connected to private branch exchange 102 via the Public Switched Telephone Network, which is a complex of telecommunications equipment that is owned and operated by different entities throughout the World. As those who are skilled in the art will appreciate, the endpoints within environment 101 might be interconnected with private branch exchange 102 via other combinations of network infrastructure.

Private branch exchange 102 is a data-processing system, such as a server or switch, which enables the users of multiple endpoints to communicate with other endpoint users, in well-known fashion. Exchange 102 receives audio and control signals from endpoints that are involved in one or more telephone calls, generates output signals, and applies those generated signals to selected phone calls or endpoints, in accordance with the illustrative embodiment of the present invention. Exchange 102 is described in detail below and with respect to FIG. 3.

In accordance with the illustrative embodiment, the techniques of the illustrative embodiment are implemented at a private branch exchange. However, it will be clear to those skilled in the art, after reading this specification, how to make and use alternative embodiments of the present invention, in which the techniques are implemented at a data-processing system that comprises functionality other than that of a private branch exchange, such as a teleconference bridge.

Figure 2:
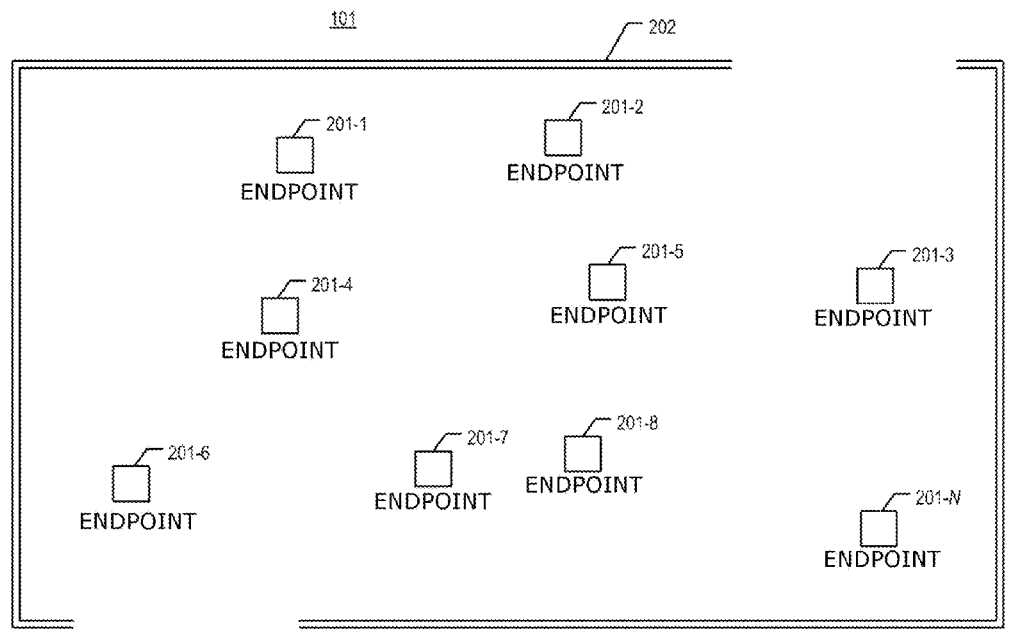
FIG. 2 depicts a diagram of the salient components of enterprise telecommunications environment 101, within system 100.

FIG. 2 depicts a diagram of the salient components of enterprise telecommunications environment 101, in accordance with the illustrative embodiment of the present invention. In particular, FIG. 2 depicts an overhead view of an office workplace, in which many people are situated within the office space and, as office workers, are also users of telecommunications endpoints. Depicted telecommunications endpoints 201-1 through 201-N can be situated on a desk within an employee's office or cubicle, in a conference room, or in a common area such as a pantry, copy room, or hallway wall. Endpoints 201-1 through 201-N are connected to private branch exchange 102 in well-known fashion.

For reasons of clarity, the office space depicted in FIG. 2 is shown as a single space, enclosed by wall 202, with no additional wall or partitions separating the endpoints from one another. However, it will be clear to those skilled in the art, after reading this specification, how to make and use alternative embodiments of the present invention, in which there is a different partitioning between two or more of the endpoints than depicted. For example, the endpoints might be in rooms separated by walls, in cubicles with half-wall partitions, or arranged in some combination thereof. Additionally, two or more endpoints might be collocated within the same room or cubicle.

Furthermore, although FIG. 2 depicts a total of nine telecommunications endpoints, it will be clear to those skilled in the art, after reading this specification, how to make and use alternative embodiments with a different number of endpoints.

Telecommunications endpoint 201-$n$, where n has a value between 1 and N, inclusive, is capable of originating, receiving, or otherwise handling a telephone call for its user. Endpoint 201-$n$ is able to call, or to be called by, another endpoint. In order for its user to participate in a telephone call, endpoint 201-$n$ is able to dial a telephone number that private branch exchange 102 understands; the exchange subsequently routes the corresponding call to the appropriate endpoint being called. Endpoint 201-$n$ can be an analog telephone, an ISDN terminal, a softphone, an Internet-Protocol phone, a cellular phone, a cordless phone, a PBX deskset, a conference phone or "speakerphone", or some other type of telecommunications appliance.

In some embodiments, endpoint 201-$n$ is further capable of receiving a signal that can be used to affect a change in the loudspeaker volume of the endpoint. In any event, it will be clear to those skilled in the art how to make and use endpoint 201-$n$.

Figure 3:
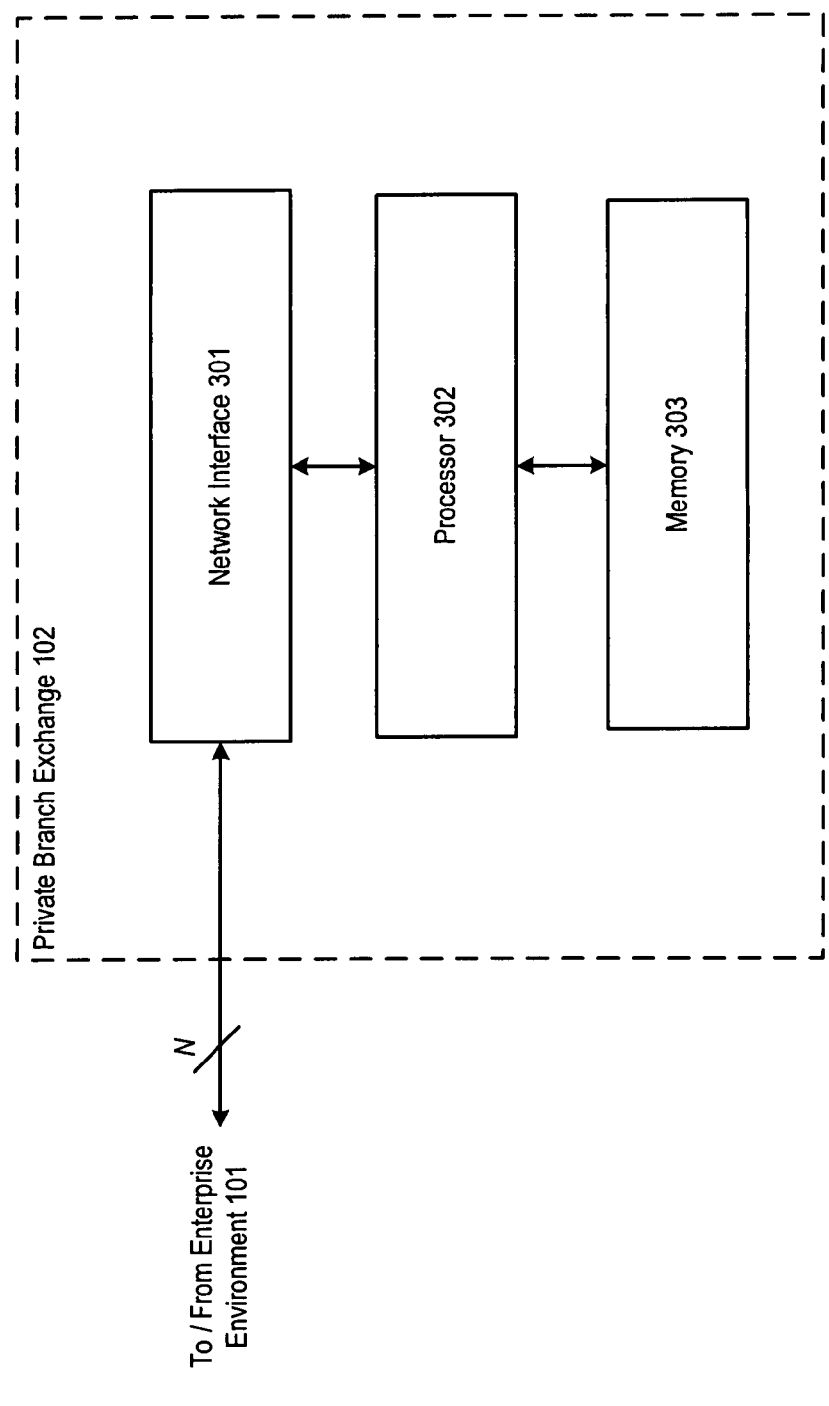
FIG. 3 depicts a block diagram of the salient components of private branch exchange 102, within system 100.

FIG. 3 depicts a block diagram of the salient components of private branch exchange 102, in accordance with the illustrative embodiment of the present invention. Exchange 102 comprises network interface 301, processor 302, and memory 303, interconnected as shown. Exchange 102 is capable of performing the tasks described below and with respect to FIG. 4.

Network interface 301 comprises the circuitry that enables exchange 102 to receive signals from and transmit signals to the endpoints within environment 101, in well-known fashion. In accordance with the illustrative embodiment, interface 301 receives and transmits audio signals that are represented in Internet Protocol packets, in well-known fashion. As those who are skilled in the art will appreciate, in some alternative embodiments interface 301 receives and transmits audio signals represented in a different format.

In accordance with the illustrative embodiment, exchange 102 communicates with each endpoint via a different communication port, as is known in the art. As those who are skilled in the art will appreciate, the ports can be implemented in software or in hardware, or both. It will be clear to those skilled in the art how to make and use telecommunications systems where an endpoint has its own port at exchange 102 or an endpoint shares a port with another endpoint, or both.

Processor 302 is a general-purpose processor that is capable of receiving information from network interface 301, of executing instructions stored in memory 303, of reading data from and writing data into memory 303, and of transmitting information to network interface 301. In some alternative embodiments of the present invention, processor 302 might be a special-purpose processor.

Memory 303 stores the instructions and data used by processor 302, in well-known fashion. Memory 303 might be any combination of dynamic random-access memory (RAM), flash memory, disk drive memory, and so forth.

In accordance with the illustrative embodiment, memory 303 stores a database that comprises information related to the distance between each endpoint, for one or more pairs of endpoints, or the geo-location of each endpoint. In some alternative embodiments, the database is stored at another data-processing system, and exchange 102 is able to access the database through the other system. Exchange 102 also has access to information stored about each endpoint 201-*n*, such as the endpoint type (e.g., speakerphone, handset, etc.), whether an endpoint is currently in use or not, which characteristics of loudspeaker volume are adjustable for each endpoint, and the current settings of those characteristics.

Figure 4:
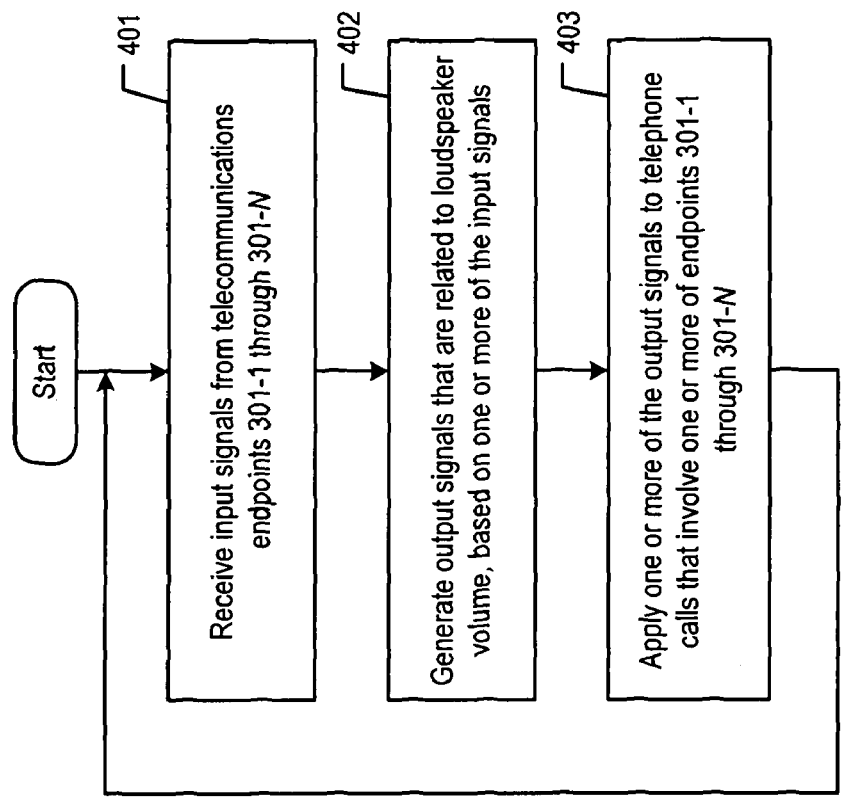
FIG. 4 depicts a flowchart of the salient tasks that are related to managing the acoustic noise within enterprise environment 101, in accordance with the illustrative embodiment of the present invention.

FIG. 4 depicts a flowchart of the salient tasks that are related to managing the acoustic noise within enterprise environment 101, in accordance with the illustrative embodiment of the present invention. As those who are skilled in the art will appreciate, some of the tasks that appear in the flowchart can be performed in parallel or in a different order than that depicted. Moreover, those who are skilled in the art will further appreciate that in some alternative embodiments of the present invention, only a subset of the depicted tasks are performed.

At task 401, private branch exchange 102 receives one or more signals from endpoints 201-1 through 201-N, where the signals indicate whether each endpoint is in use or not. An endpoint is in use, for example, when its user is utilizing the endpoint to handle a telephone call, to retrieve voice mail, or to invoke some other feature that results in the signaling of exchange 102. The signaling can come from endpoint 201-*n* in the form of an "off-hook" indication, dialed digits, or a packet message that indicates that the user is utilizing the endpoint. As those who are skilled in the art will appreciate, other signals from endpoint 201-*n* can be used to indicate or infer whether the endpoint is being used.

In some alternative embodiments, private branch exchange 102 monitors for the presence of people even when the endpoints are not in use. For example, through the microphone of each endpoint, exchange 102 can monitor for sounds, classify those sounds by probable source (e.g., human-made, etc.), and determine whether a human user is adjacent to an endpoint. As those who are skilled in the art will appreciate, exchange 102 can check for audio signals continuously, sporadically, or periodically.

In some embodiments, exchange 102 also monitors the background noise that is not attributed to telecommunications endpoints—that is, non-telephone background noise. The background noise referred to here includes uniform, non-transient noise that is not associated with telephone sound reproduction. For example, the background noise can include white or pink noise that is attributed to sources such as building fans, HVAC equipment, and sound-masking systems. Often, this type of background noise can have the beneficial effect of masking transient sounds such as conversations. In order to take advantage of the masking effect, exchange 102 receives and monitors measurements of the non-telephone background noise—for example, through the microphones of one or more endpoints. To ensure that the background noise being measured for a particular area cannot be attributed to the endpoints, exchange 102 uses the measurement received from an endpoint only when other endpoints within the area of interest are not in use. Knowing when an endpoint is not in use can be inferred from the in-use signals that exchange 102 receives, as described earlier.

At task 402, exchange 102 generates, for a given endpoint 201-*n*, a controlling signal that specifies the value of a first characteristic of loudspeaker volume, such as the maximum volume level allowed at the endpoint or the loudspeaker volume level to be applied to the endpoint. As those who are skilled in the art will appreciate, other characteristics of loudspeaker volume can be controlled as well. The controlling signal is based on in-use signals, or human-produced audio signals, originating from one or more endpoints other than the endpoint to be controlled. Exchange 102 generates a controlling signal for each endpoint to be controlled.

In accordance with the illustrative embodiment, the controlling signal is also based on whether the endpoint to be controlled is a speakerphone, which comprises a loudspeaker that emits acoustic signals audible by other people in the vicinity of the endpoint, in addition to the endpoint's user. Exchange 102 is aware that the controlled endpoint is a speakerphone, based on the information about each endpoint that it maintains in its database. In some alternative embodiments, exchange 102 receives a signal from endpoint 201-*n* through which the exchange is able to determine whether the endpoint has a presently-enabled loudspeaker that is audible to others.

For example, suppose that endpoint 201-1 is already in use and the user of endpoint 201-2 wishes to place a telephone call. Endpoint 201-2 is a speakerphone. In accordance with the illustrative embodiment, exchange 102 generates a controlling signal for endpoint 201-2 that is intended to affect one or more characteristics of endpoint 201-2's loudspeaker volume. In this example, the controlling signal might serve to limit the maximum allowed volume level that endpoint 201-2's user can select (e.g., four chevrons on the volume display out of ten, etc.). As those who are skilled in the art will appreciate, in some alternative embodiments, audio characteristics of the endpoint loudspeaker other than volume can be controlled, such as output audio bandwidth and dynamic range.

The idea is that when endpoint 201-2 is a speakerphone and is currently in use, the endpoint might prove to be distracting to people in the vicinities of endpoints 201-1 and 201-5, as depicted in FIG. 2. In accordance with the illustrative embodiment, exchange 102 determines that people are in the vicinities of endpoints 201-1 and 201-5 by monitoring whether the endpoints are in use. Detecting that the endpoints are in use implies that people are present (i.e., at endpoints 201-1 and 201-5) who can be distracted by another person talking loudly on his speakerphone (i.e., endpoint 201-2).

As those who are skilled in the art will appreciate, an endpoint that is to be controlled, such as endpoint 201-2, might also be an endpoint in an area to be shielded from loud volume levels caused by other endpoints, such as endpoint 201-3. In also protecting, from loud volume levels, an endpoint to be controlled, the exchange of the illustrative embodiment further manages the noise levels by giving the endpoint's user less of a need to turn up the volume on his speakerphone.

In some alternative embodiments, the controlling signal can also be based on one or more additional considerations such as, while not being limited to, the following:

i. a signal received acoustically (i.e., via a microphone) at the endpoint to be controlled (i.e., the second endpoint in the example);
  ii. a signal received acoustically at the endpoint in the area being shielded from loud volume levels (i.e., the first endpoint in the example);

iii. the spatial closeness of the first telecommunications endpoint to the second telecommunications endpoint;
iv. the language being spoken by the user of the first telecommunications endpoint and the language being spoken by the user of the second telecommunications endpoint;
v. the gender of the user of the first telecommunications endpoint and the gender of the user of the second telecommunications endpoint; and
vi. the non-telephone background noise that is not attributed to the endpoints (e.g., building fan noise, etc.), as measured at one or more endpoints of interest.

For example, the controlling signal for endpoint 201-2 might be based whether endpoint 201-1 is in use, but it might not be based on whether endpoint 201-6 is in use; this is because endpoint 201-6 is relatively far from endpoint 201-2 and, therefore, the users of those two endpoints are also far from each other.

Some other considerations such as gender or language can affect whether one person is distracted by another person. For example, an English-speaking person at endpoint 201-1 might be distracted by another English-speaking person, but not by a Mandarin-speaking person, at endpoint 201-2. Furthermore, a male employee at endpoint 201-1 might be distracted by another male employee who is talking at endpoint 201-2, but not by a female employee using endpoint 201-2. As those who are skilled in the art will appreciate, in some alternative embodiments, other considerations can be applied in determining the controlling signal, such as other vocal properties (e.g., timbre, etc.) of one or more endpoint users or properties of the audio content (e.g., conversational topic, etc.) of what one or more endpoint users are saying.

With respect to basing the controlling signal on the non-telephone background noise, in some embodiments exchange 102 permits a higher loudspeaker volume at a second endpoint for a higher non-telephone background noise level as measured at or near a first endpoint. This is based on the idea introduced earlier that the background noise can serve to mask the transient noises being reproduced by the second endpoint's loudspeaker (i.e., that of the endpoint to be controlled).

At task 403, exchange 102 applies the generated controlling signal to the corresponding endpoint to be controlled, for each endpoint to be controlled. In accordance with the illustrative embodiment, exchange 102 transmits the controlling signal to the corresponding endpoint, which endpoint is then able to use the signal to control one or more characteristics of loudspeaker volume. In some alternative embodiments, exchange 102 directly uses the controlling signal to affect the level of the audio signals that are provided to the endpoint being controlled, in which case the controlling signal generated at task 402 might be a memory write or some other representation that is used within exchange 102 itself.

Exchange 102 continually executes the already-described tasks during its operation, thereby controlling the loudspeaker volumes of some or all of the endpoints within environment 101.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    receiving, at a data-processing system, (i) a first signal that indicates that a first telecommunications endpoint is in use, and (ii) a second signal that indicates that a second telecommunications endpoint is in use, the first telecommunications endpoint not communicating with the second telecommunications endpoint;
    generating, based on the first signal and on whether the second telecommunications endpoint is a speakerphone, a third signal that specifies a value of a first characteristic of loudspeaker volume; and
    transmitting the third signal to the second telecommunications endpoint that automatically adjusts a loudspeaker volume of the second telecommunications endpoint.

2. The method of claim 1, wherein the first characteristic of loudspeaker volume is one of i) the maximum volume level allowed and ii) the volume level to be used.

3. The method of claim 1, further comprising:
    generating a fourth signal that specifies the value of a second characteristic of loudspeaker volume, the fourth signal being based on the second signal; and
    transmitting the fourth signal to the first telecommunications endpoint.

4. The method of claim 3 wherein the fourth signal is also based on whether the first telecommunications endpoint is a speakerphone.

5. The method of claim 1 wherein the third signal is also based on the spatial closeness of the first telecommunications endpoint to the second telecommunications endpoint.

6. The method of claim 1 wherein the third signal is also based on the language being spoken by the user of the first telecommunications endpoint and the language being spoken by the user of the second telecommunications endpoint.

7. The method of claim 1 wherein the third signal is also based on the gender of the user of the first telecommunications endpoint and the gender of the user of the second telecommunications endpoint.

8. The method of claim 1 wherein the third signal is also based on the background noise that is not attributed to telecommunications endpoints, as measured at the first telecommunications endpoint.

9. A method comprising:
    receiving, at a data-processing system, (i) a first signal that indicates that a first telecommunications endpoint is in use, (ii) a second signal that indicates that a second telecommunications endpoint is in use, and (iii) a third signal that represents background noise that is not attributed to telecommunications endpoints, as measured at the first telecommunications endpoint;
    generating a fourth signal that specifies a value of a first characteristic of loudspeaker volume, the fourth signal being based on i) the first signal, ii) whether the second telecommunications endpoint is a speakerphone, and iii) the third signal; and
    applying the fourth signal during a call that involves the second telecommunications endpoint such that a loudspeaker volume of the second telecommunications endpoint is adjusted automatically.

10. The method of claim 9 wherein the first characteristic of loudspeaker volume is one of i) the maximum volume level allowed and ii) the volume level to be used.

11. The method of claim 9 further comprising:
    generating a fifth signal that specifies the value of a second characteristic of loudspeaker volume, the fifth signal being based on the second signal; and
    transmitting the fifth signal to the first telecommunications endpoint.

12. The method of claim 11 wherein the fifth signal is also based on whether the first telecommunications endpoint is a speakerphone.

13. The method of claim 9 wherein the fourth signal is also based on the spatial closeness of the first telecommunications endpoint to the second telecommunications endpoint.

14. The method of claim 9 wherein the fourth signal is also based on the language being spoken by the user of the first telecommunications endpoint and the language being spoken by the user of the second telecommunications endpoint.

15. The method of claim 9 wherein the fourth signal is also based on the gender of the user of the first telecommunications endpoint and the gender of the user of the second telecommunications endpoint.

16. A method comprising:
- receiving, at a data-processing system, (i) a first signal that indicates that a first telecommunications endpoint is in use, and (ii) a second signal that indicates that a second telecommunications endpoint is in use;
- generating (i) a third signal that specifies a value of a first characteristic of loudspeaker volume, the third signal being based on the first signal, and (ii) a fourth signal that specifies the value of the first characteristic of loudspeaker volume, the fourth signal being based on the second signal; and
- applying (i) the third signal during a first call that involves the second telecommunications endpoint and (ii) the fourth signal during a second call that involves the first telecommunications endpoint, such that a loudspeaker volume is adjusted automatically.

17. The method of claim 16 wherein the third signal is also based on whether the second telecommunications endpoint is a speakerphone.

18. The method of claim 17 wherein the fourth signal is also based on whether the first telecommunications endpoint is a speakerphone.

19. The method of claim 18 wherein the first characteristic of loudspeaker volume is one of i) the maximum volume level allowed and ii) the volume level to be used.

20. The method of claim 18 wherein the third signal is also based on the spatial closeness of the first telecommunications endpoint to the second telecommunications endpoint.

21. The method of claim 18 wherein the third signal is also based on the language being spoken by the user of the first telecommunications endpoint and the language being spoken by the user of the second telecommunications endpoint.

22. The method of claim 18 wherein the third signal is also based on the gender of the user of the first telecommunications endpoint and the gender of the user of the second telecommunications endpoint.

23. The method of claim 16 wherein the third signal is also based on the background noise that is not attributed to telecommunications endpoints, as measured at the first telecommunications endpoint.

* * * * *